United States Patent
Bang et al.

(10) Patent No.: US 11,265,874 B2
(45) Date of Patent: *Mar. 1, 2022

(54) BEAMFORMING TRAINING

(71) Applicant: LG ELECTRONICS INC., Seoul (KR)

(72) Inventors: Saehee Bang, Seoul (KR); Jinmin Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 54 days.

This patent is subject to a terminal disclaimer.

(21) Appl. No.: 16/818,712

(22) Filed: Mar. 13, 2020

(65) Prior Publication Data

US 2020/0213986 A1 Jul. 2, 2020

Related U.S. Application Data

(63) Continuation of application No. 16/322,256, filed as application No. PCT/KR2018/004234 on Apr. 11, 2018, now Pat. No. 10,631,288.

(Continued)

(51) Int. Cl.
*H04W 72/04* (2009.01)
*H04B 7/0491* (2017.01)
(Continued)

(52) U.S. Cl.
CPC ........ *H04W 72/044* (2013.01); *H04B 7/0491* (2013.01); *H04B 7/06* (2013.01);
(Continued)

(58) Field of Classification Search
None
See application file for complete search history.

(56) References Cited

U.S. PATENT DOCUMENTS

2015/0244432 A1 8/2015 Wang
2015/0289147 A1 10/2015 Lou et al.
(Continued)

FOREIGN PATENT DOCUMENTS

CN 101939926 1/2011
CN 102026341 4/2011
(Continued)

OTHER PUBLICATIONS

IEEE Part 11: Wireless LAN Medium Access Control (MAC) and Physical Layer (PHY) Specifications, Amendment 4: Enhancements for Very High Throughput in the 60 GHz Band, dated Dec. 2012 (Year: 2012).*

(Continued)

*Primary Examiner* — Jamaal Henson
(74) *Attorney, Agent, or Firm* — Lee Hong Degerman Kang Waimey

(57) ABSTRACT

Provided are a method for beamforming training and an apparatus using the same. An STA receives a beacon frame from an AP during a BTI. The STA transmits SSW frames during an A-BFT. The beacon frame comprises an A-BFT length indicating the number of a plurality of SSW slots included in the A-BFT, a FSS field indicating the number of the SSW frames allowed in one SSW slot among the plurality of SSW slots, and information about the type of the SSW frames used in one SSW slot. The information about the type of the SSW frames indicates that the SSW frames are determined to be one from among first type SSW frames and second type SSW frames. The second type SSW frames have a smaller size than that of the first type SSW frames. If the SSW frames are determined to be the second type SSW frames, the FSS field indicates the number of the second type SSW frames that can be transmitted in one SSW slot.

10 Claims, 11 Drawing Sheets

Related U.S. Application Data

(60) Provisional application No. 62/501,724, filed on May 4, 2017.

(51) Int. Cl.
    *H04W 16/28*     (2009.01)
    *H04B 7/06*     (2006.01)
    *H04W 84/12*     (2009.01)

(52) U.S. Cl.
    CPC ......... *H04W 16/28* (2013.01); *H04W 72/046* (2013.01); *H04W 84/12* (2013.01)

(56) References Cited

U.S. PATENT DOCUMENTS

| | | | |
|---|---|---|---|
| 2016/0190686 A1 | 6/2016 | Gao et al. | |
| 2016/0191132 A1 | 6/2016 | Rajagopal et al. | |
| 2017/0086211 A1* | 3/2017 | Sahin | H04W 48/16 |
| 2017/0118656 A1* | 4/2017 | Xin | H04B 7/0695 |
| 2017/0134145 A1 | 5/2017 | Xin et al. | |
| 2017/0207837 A1* | 7/2017 | Kim | H01Q 3/005 |
| 2018/0098561 A1* | 4/2018 | Newman | F25D 3/10 |
| 2018/0199324 A1* | 7/2018 | Sun | H04W 16/28 |
| 2018/0206139 A1 | 7/2018 | Wang et al. | |
| 2019/0052327 A1* | 2/2019 | Motozuka | H04W 28/06 |
| 2019/0098561 A1 | 3/2019 | Zhou | |
| 2019/0182815 A1 | 6/2019 | Bang et al. | |

FOREIGN PATENT DOCUMENTS

| | | |
|---|---|---|
| CN | 103718591 | 4/2014 |
| KR | 20140057908 | 5/2014 |
| WO | 2017048091 | 3/2017 |
| WO | 2017067378 | 4/2017 |

OTHER PUBLICATIONS

IEEE Part 11: Wireless LAN Medium Access Control (MAC) and Physical Layer (PHY) Specifications, Amendment 4: Enhancements for Very High Throughput in 60 GHz Band, Dated Dec. 2012 (Year: 2012).*

United States Patent and Trademark Office U.S. Appl. No. 16/322,256, Office Action dated Jul. 10, 2019, 20 pages.

United States Patent and Trademark Office U.S. Appl. No. 16/322,256, Notice of Allowance dated Dec. 18, 2019, 10 pages.

IEEE "Part 11: Wireless LAN Medium Access Control (MAC) and Physical Layer (PHY) Specifications: Amendment 3: Enhancements for Very High Throughput in the 60 GHz Band" p. 116 (Year: 2012).

Lei Huang et al., "CR on BRP Frame in Candidate Draft D0.2", IEEE P802.11 Wireless LANS, Feb. 22, 2017 See 9.4.2.130 Year: 2017).

European Patent Office Application Serial No. 18794412.9, Search Report dated Jan. 3, 2020, 10 pages.

Qualcomm, et al., "Short SSW Format for 11ay", IEEE 802.11-16/0416-00-00, Mar. 2016, 11 pages.

PCT International Application No. PCT/KR2018/004234, International Search Report dated Jul. 16, 2018, 4 pages.

Kyungtae Jo et al., "Short SSW Frame for A-BFT," doc.: IEEE 802.11-17/0107-00-00ay, Jan. 2017, 9 pages.

Rob Sun, et al., "Optimized Short SSW Frame addressing scheme to reduce the false positive," doc.: IEEE 802.11-17/0022r1, Jan. 2017, 19 pages.

The State Intellectual Property Office of the People's Republic of China Application Serial No. 201880034301.2, Office Action dated Dec. 22, 2021, 8 pages.

* cited by examiner

BEAMFORMING TRAINING

CROSS-REFERENCE TO RELATED APPLICATIONS

This application is a continuation of U.S. patent application Ser. No. 16/322,256, filed on Jan. 31, 2019, which is the National Stage filing under 35 U.S.C. 371 of International Application No. PCT/KR2018/004234, filed on Apr. 11, 2018, which claims the benefit of U.S. Provisional Application No. 62/501,724, filed on May 4, 2017, the contents of which are all hereby incorporated by reference herein in their entireties.

BACKGROUND OF THE INVENTION

Field of the Invention

The present invention relates to wireless communication and, more particularly, to beamforming training in a wireless communication system.

Related Art

An institute of electrical and electronics engineers (IEEE) 802.11ad standard is a high-speed wireless communication protocol operating at a band of at least 60 GHz. Although a signal reaches in the range of about 10 meters, a throughput to be supported may be at least 6 Gbps. Since it operates at a high frequency band, signal propagation is dominated by ray-like propagation. The more the transmit (TX) or receive (RX) antenna beam aligned towards a strong spatial signal path, the better the signal quality may be.

The IEEE 802.11ad standard provides a beamforming training process for antenna beam alignment. IEEE 802.11ay is a next-generation standard which is being developed aiming at a throughput of at least 20 Gbps.

One of requirements discussed in the IEEE 802.11ay is to support a multi-channel and a bonding channel. A method for applying an operation using a single channel to the multi-channel is provided.

SUMMARY OF THE INVENTION

Technical Objects

The present invention provides a method for beamforming training that supports various types of sector sweep (SSW) frames and a device using the same.

Technical Solutions

An example of this specification proposes a method for performing beamforming training in a wireless communication system.

The example of this specification is performed by an STA. Herein, the STA may correspond to a responder participating in a beamforming training, and an AP may correspond to an initiator initiating the beamforming training.

The station (STA) receives a beacon frame from an access point (AP) during a beacon transmission interval (BTI).

The STA may transmit a Sector SWeep (SSW) during an association beamforming training (A-BFT).

The beacon frame includes an A-BFT length indicating a number of multiple SSW slots (or an A-BFT length including information on a number of multiple SSW slots) that are included in the A-BFT, a FSS field indicating a number of SSW frames (or an FSS field including information on a number of SSW frames) allowed (authorized or approved) in one slot, among the multiple SSW slots, and information on a type of the SSW frame that is used in the one slot.

The information on a type of the SSW frame indicates that the SSW frames are determined as one of a first type SSW frame and a second type SSW frame. The first type SSW frame may correspond to a legacy SSW frame that is supported by 802.11ad, and the second type SSW frame may correspond to a short SSW frame that is supported by 802.11ay. Herein, the second type SSW frame has a size that is smaller than the first type SSW frame.

Since the size of the second type SSW frame is smaller than the size of the first type SSW frame, the beamforming time may be reduced.

Additionally, the second type SSW frame may also be used in the same A-BFT period. More specifically, the A-BFT length may be fixed regardless of the type of the SSW frame. Accordingly, a length of the multiple SSW slots within the A-BFT and a length of the one SSW slot may be fixed. More specifically, the STA may perform transmission by increasing the number of short SSW frames that can be transmitted within one SSW slot (aSSSlot Time) while maintaining the legacy 802.11ad A-BFT period.

Additionally, the AP may notify the number of short SSW frames by re-using the FSS field, which indicates the number of SSW frames. If the SSW frames are determined as the second type SSW frame, the FSS field may indicate a number of the second type SSW frames that can be transmitted within the one SSW slot.

Additionally, if the SSW frames are determined as the second type SSW frame, the FSS field may indicate a maximum number of the second type SSW frames that can be transmitted within the one slot. Thus, a maximum number of the second type SSW frames or less may be transmitted within the one SSW slot. More specifically, based on the A-BFT length, the FSS field, and the information on a type of the SSW frame, the maximum number of the second type SSW frames or less may be transmitted within one SSW slot during a fixed A-BFT length.

Additionally, if the SSW frames are determined as the first type SSW frame, the FSS field may indicate a number of the first type SSW frames that are transmitted within the one SSW slot.

The maximum number of the second type SSW frames may be greater than or equal to the number of the first type SSW frames. More specifically, if the second type SSW frame are used, a larger number of SSW frame may be transmitted for performing sector sweep, as compared to when using the first type SSW frame. Therefore, since the number of SSW slots that are needed for transmitting all of the SSW frames may be reduced, the time needed for performing beamforming may be reduced.

Additionally, the one SSW slot may include a transmission time of the SSW frame and an Inter Frame Spacing (IFS) time. The transmission time of the SSW frame may correspond to a value that is obtained by multiplying the transmission time of one first type SSW frame by the number of first type SSW frames. The IFS time may correspond to a value that is obtained by multiplying 1us by the number of first type SSW frames. Herein, the transmission time of the one first type SSW frame may be equal to 14.91 us.

Furthermore, the one SSW slot may include a transmission time of the SSW frame and an Inter Frame Spacing (IFS) time. The transmission time of the SSW frame may correspond to a value that is obtained by multiplying the transmission time of one second type SSW frame by the maximum number of second type SSW frames. The IFS time may correspond to a value that is obtained by multiplying 1us by the maximum number of second type SSW frames. Herein, the transmission time of the one second type SSW frame may be equal to 8.8 us.

Effects of the Invention

Since the size of a short SSW frame is smaller than the size of a legacy SSW frame, the time consumed for the beamforming training may be reduced by providing a larger number of opportunities for stations to participate in the beamforming procedure at a same time. More specifically, since the number of slots that are needed for transmitting all of the sectors, which can be transmitted by responders to an initiator, is decreased, the time required for performing beamforming may be reduced.

DESCRIPTION OF EXEMPLARY EMBODIMENTS

Below, a wireless communication system that operates at a frequency band of 60 GHz or 45 GHz or above will be exemplarily described. A plurality of channels may be provided. For example, one channel may have a bandwidth of 2.16 GHz.

A station (STA) may be referred to as various names such as a wireless device, a mobile station (MS), a network interface device, a wireless interface device, or a user.

A Basic service set (BSS) is a building block of the wireless local area network (WLAN) based on the IEEE 802.11 standard. The BSS may include a plurality of STAs which perform direct communication with each other. The WLAN may provide two types of sets, for example, independent BSS (IBSS) and personal BSS (PBSS). The IBSS may be a basic type. The PBSS may be a type of wireless local area network (WLAN), in which the respective STAs communicate directly with each other, as an ad-hoc network.

A STA in the PBSS may perform a role of the PBSS control point (PCP). The PCB may provide a beacon transmission, a service period (SP) allocation, etc.

An access point (AP) may be an entity which provides a connection (or association) between multiple BSSs. One STA in the PBSS may perform a role of the AP and another STA that belongs to different BSSs may communicate through the AP. The AP may manage the beacon transmission and association (or association response). Hereinafter, the AP and the PCP, which are not divided separately, may be referred to as a "AP".

The STA may include non-AP STA or AP unless a STA function and an AP function are divided separately. When a communication between the STA and the AP is described, the STA may be interpreted as the non-AP STA. When a communication between a STA and a STA is described or when the AP function is not required separately, the STA may be the non-AP STA or the AP.

Figure 1:
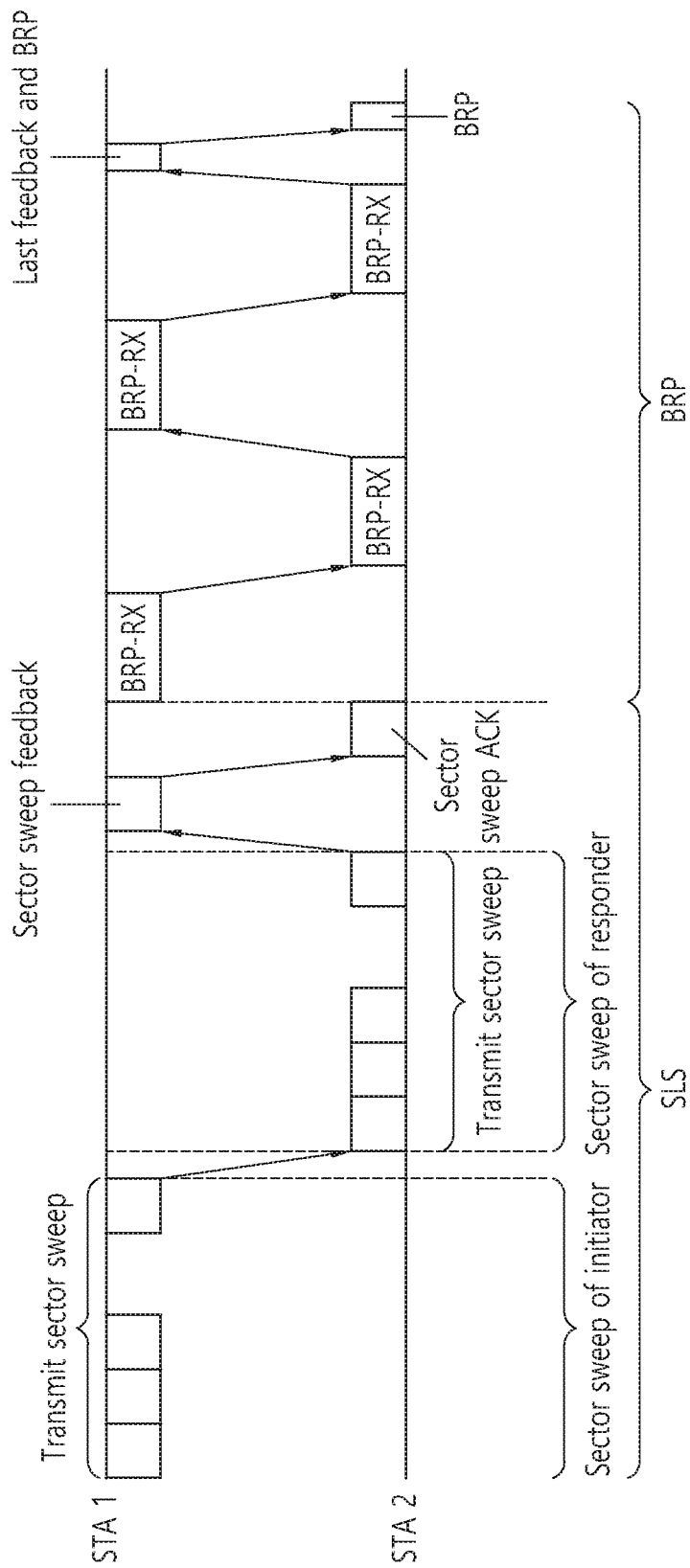
FIG. 1 shows a conventional beamforming training procedure.

FIG. 1 shows a conventional beamforming training procedure. This procedure may refer to section 9.35 of the IEEE 802.11ad standard.

A STA1 may be an initiator that initiates beamforming (BF) training. A STA2 that participates in the BF training may be a responder.

The BF training provides a transmission of a BF training frame using a sector sweep (SSW) and a signaling required for each STA to determine setting an appropriate antenna system. The BF training process may include a sector level sweep (SLS) process and a beam refinement protocol (BRP) process. The SLS process for the sector sweep may allow communication between the STAs to provide a control physical layer (PHY). The BRP process provides a refinement of an antenna weight vector between the transmitter and the receiver.

The BF training may be initiated by the initiator from the SLS process. The SLS process may include an initiator sector sweep (ISS) for training an initiator link, a responder sector sweep (RSS) for training a responder link, a sector sweep (SSW) feedback, and a SSW ACK.

During the ISS process, the initiator may transmit each frame (a beacon frame or a SSW frame) to each of the sectors which the initiator has. During the RSS process, the responder may transmit each of the SSW frames to each of the sectors which the responder has. During the SSW process, the initiator may send a SSW feedback frame to the responder. The SSW feedback frame may include information about a sector and an antenna which are selected by the initiator. The SSW ACK frame may be transmitted through a sector included in the SSW feedback frame which is most recently received and the antenna.

A sector may correspond to a specific antenna beam or pattern. A transmit (TX) sector may be a sector for a TX antenna, and a receive (RX) sector may be a sector for a RX antenna.

A sector (a TX sector and/or a RX sector) in which an initiator has the best quality and a sector (a TX sector and/or a RX sector) in which a responder has the best quality may be determined through the SLS process.

When the SLS process is completed, the BRP process for training an RX antenna array and a TX antenna array may be initiated. The BRP process may include a BRP setup subphase, a multiple sector ID detection (MID) subphase, a beam combining (BC) subphase, and the like.

Figure 2:
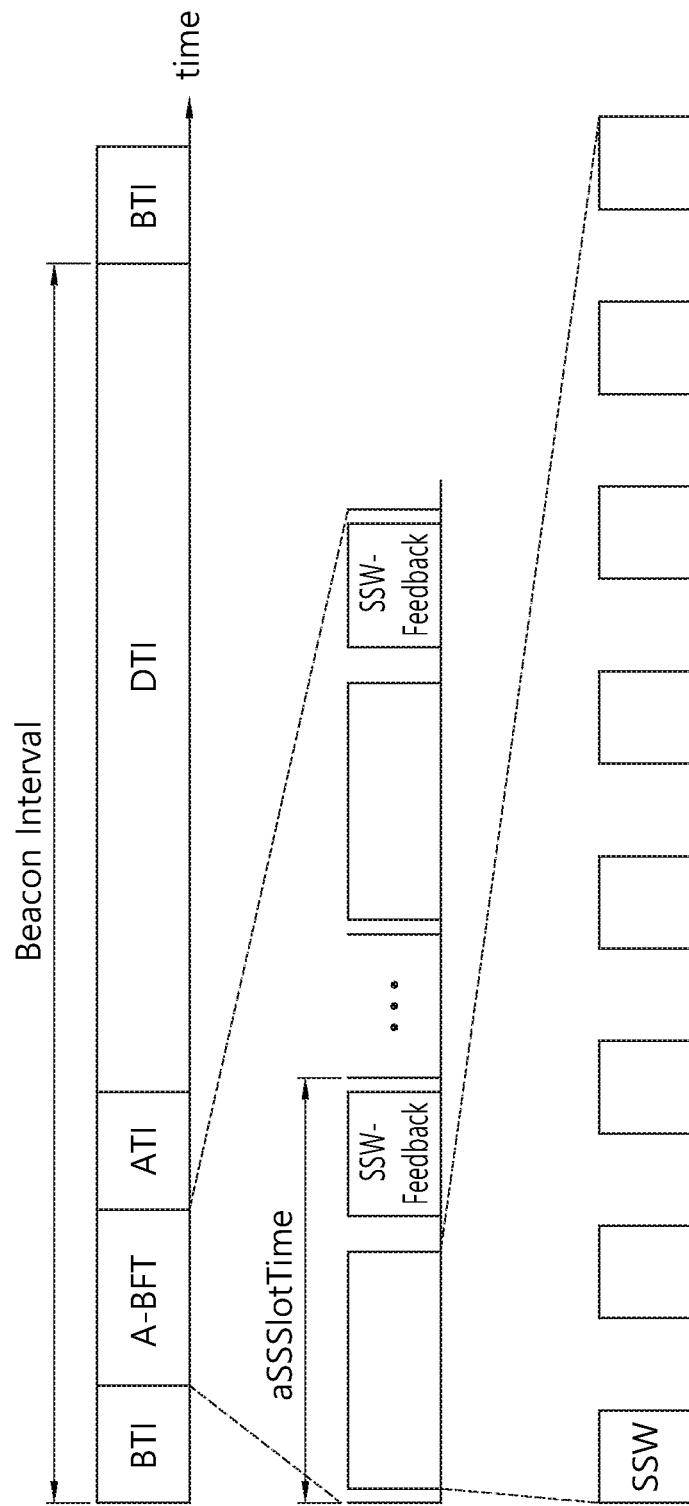
FIG. 2 is a diagram illustrating an example of a SLS process.

FIG. 2 is a diagram illustrating an example of a SLS process.

When an initiator is an AP and a responder is a non-AP STA, a beacon frame may be transmitted during the ISS process. A beacon interval may be a time period in which a beacon frame is transmitted.

A beacon transmission interval (BTI) may be a time interval between the start of a first beacon transmission by the AP in a beacon interval to the end of a last beacon transmission by the AP in the same beacon interval. An association beamforming training (A-BFT) may be a time period including a responder sector sweep (RSS) and a SSW feedback in the SLS process for beamforming (BF). An announcement transmission interval (ATI) may be a time interval for a request-response based management between the AP and the STA. A data transfer interval (DTI) may be a time interval for exchanging data.

The A-BFT is performed by a SSW slot unit, and a length of the A-BFT is defined as an integer multiple length of the SSW slot. A-BFT length information may be included in the beacon frame.

The SSW slot has a length of aSSSlotTime. The aSSSlotTime is defined as follows: aSSSlotTime=aAirPropagationTime+aSSDuration+ MBIFS+aSSFBDuration+MBIFS. The aAirPropagationTime is a parameter considering the propagation delay between the initiator and the responder. The aSSDuration is a time for the responder to transmit M SSW frames in the SSW slot. Information about the number M of allowed SSW frames per a SSW slot may be included in the beacon frame. FIG. 2 is a diagram illustrating a case where M=8. Medium beamforming interframe spacing (MBIFS) represents an interval between the BTI and A-BFT or an interval between ISS, RSS, SSW feedback, and SSW ACK.

At the beginning of each A-BFT, the STA as the responder may invoke a random back-off process to start or resume the RSS. At the beginning of the A-BFT, the STA may randomly select a backoff count from a uniform distribution [0, (A-BFT length−1)]. The STA decrements the backoff counter by one at the end of each SSW slot. The STA initiates RSS in the corresponding SSW slot when the back-off count value is 0 at the start of the SSW slot. In the corresponding SSW slot, the STA may transmit a maximum of M SSW frames. If there are more SSW frames sent by the STA, the RSS may be resumed in the next SSW slot before the A-BFT is finished. If the RSS is not completed before the A-BFT is finished, the backoff process may be performed again before the RSS is resumed in the next A-BFT.

The AP may send a SSW feedback before the SSW slot expires. The information included in the SSW feedback may be based on the SSW frame received in the SSW slot where the SSW feedback is transmitted. The SSW feedback may include information about a sector and an antenna which are selected by the AP.

The STA has an RSS fail count. Although the RSS fail count is performed during an A-BFT(s) period, the RSS fail count may be the number of consecutive times which do not receive the SSW feedback as a response. For example, it may be assumed that an A-BFT period has 8 SSW slots and the STA transmits SSW frames in 4 SSW slots for 2 A-BFT periods. If the STA does not receive the SSW feedback from 3 SSW slots of 4 SSW slots, the value of the RSS fail count may be 3.

When the value of the RSS fail count exceeds the RSS retry limit, the STA may select a random value selected from the uniform distribution [0, RSSBackoff) as a backoff count. The STA may decrement the backoff count by 1, one by one at the end of each A-BFT. When the backoff count reaches zero, the STA may resume the RSS in the A-BFT. When the STA receives the SSW feedback during the A-BFT, the RSS fail count may be set to zero.

Figure 3:
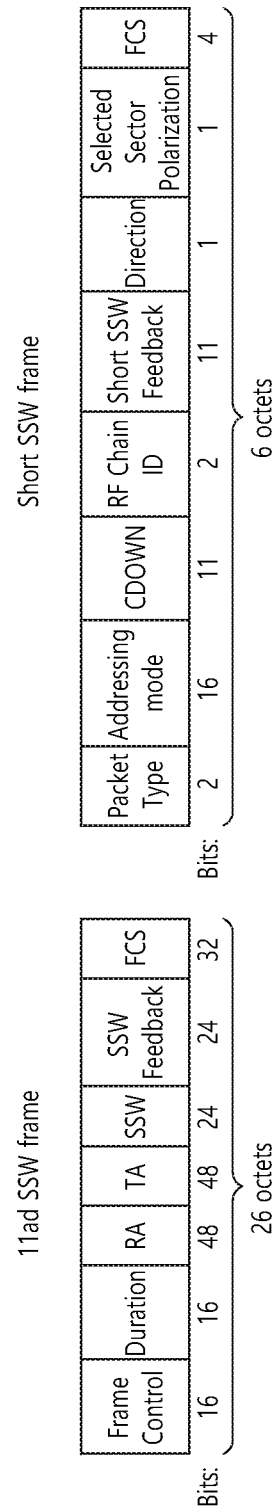
FIG. 3 illustrates various types of SSW frames.

FIG. 3 illustrates various types of SSW frames.

According to the existing IEEE 802.11ad standard, an SSW frame has a fixed size of 26 octets. In the 802.11ay, a short SSW frame having a smaller size is proposed in order to reduce beamforming time. The short SSW frame is a frame that is a frame, which reduces the SSW frame to include only the necessary information in order to reduce the beamforming time, and which transmits the reduced SSW frame.

FIG. 3 shows a six-octet short SSW frame. The short SSW frame includes frames illustrated below in Table 1. Not all the fields are necessary, and field names and bit numbers are merely for illustration.

TABLE 1

| Field name | Description |
| --- | --- |
| Packet Type | To indicate the type of this frame. '0' indicates a short SSW. |
| Addressing Mode | To indicate whether this frame is transmitted to a single receiver or a plurality of transmitters. |
| CDOWN | Down-counter to indicate the number of remaining short SSW frames to be transmitted. |
| RF Chain ID | To indicate an RF chain currently used by a transmitter for this transmission. |
| Direction | To indicate whether a transmitter is an initiator or a responder. For example, '0' indicates that this frame is transmitted by an initiator, and '1' indicates that this frame is transmitted by a responder. |
| Short SSW feedback | To indicate the CDOWN value of a short SSW frame received with the best quality in the previous sector sweep. |
| Selected Sector Polarization | To indicate a polarization state used for a short SSW frame received with the best quality in the previous sector sweep. |

Transmission time for the six-octet short SSW is shorter than transmission time for the conventional SSW frame. The characteristics of these two frames are compared in the following table.

TABLE 2

| | Conventional SSW frame | short SSW frame |
| --- | --- | --- |
| Size | 26 octets | 6 octets |
| Transmission time | 14.91 micro-seconds | 8.8 micro-seconds |
| Interframe spacing (IFS) | 1 micro-seconds | 1 micro-seconds (SBIFS) |

When SSW frames having various transmission times are defined, the number of SSW slots is increased, thus providing an STA to participate in beamforming with more opportunities for contention during A-BFT. This specification proposes a method performed by a responder, which is occupying an A-BFT period, for transmitting a short SSW frame during the corresponding A-BFT period.

In the beamforming process, the PCPs/Aps and STAs transmit a beacon frame and/or SSW frame for each sector. After receiving a beamforming frame from an initiator, the STAs functioning as responders transmit all beams for the sector sweep including the optimal beam information that each STA (or responder) has received from the initiator. This process is performed in the A-BFT period, and in order to reduce the beamforming time during this period, the short SSW frame that is newly defined in the 802.11ay may be applied herein. Thus, the responder may transmit a larger number of SSW frame during the corresponding A-BFT period.

Hereinafter, the two different types of SSW frames each having a different size will be referred to as a first type SSW frame (this type will be referred to as SSW-I) and a second type SSW frame (this type will be referred to as SSW-II). The first type SSW frame may correspond to the legacy SSW frame, and the second type SSW frame may correspond to the short SSW frame. The size of the first type SSW frame may be larger than the size of the second type SSW frame.

Since the size of the short SSW frame is smaller than the size of the legacy SSW frame, the beamforming time may be reduced. A sector sweep method of the responder will be proposed herein by applying this to the A-BFT period. Hereinafter, a sector sweep method using the legacy SSW frame and a sector sweep method using the short SSW frame will be described in detail.

According to the legacy IEEE 802.11ad, only one type of SSW frame (the first type SSW frame) may be transmitted during the A-BFT. In the 802.11ay, a method allowing the first type SSW frame or the second type SSW frame to be transmitted during the A-BFT is proposed.

In the legacy IEEE 802.11ad, before transmitting the SSW frame, the responder transmits and/or receive an A-BFT length, a FSS field, and so on, within a Beacon Interval Control Field included in the beacon frame, and, then, the responder may determine the number of beamforming frames, the beamforming time, and so on, during the A-BFT period and one sector sweep slot period within the A-BFT period.

When 11ay responders having the capability of transmitting short SSW frame occupy the SSW slots included in the A-BFT, by controlling the indicators included in the above-described beacon interval control field, SSSW frames may be transmitted instead of the SSW framed. (In addition to the beacon interval control field, the frames may be designated by using other fields or frames and/or newly defined fields or frame may be used.)

Figure 4:
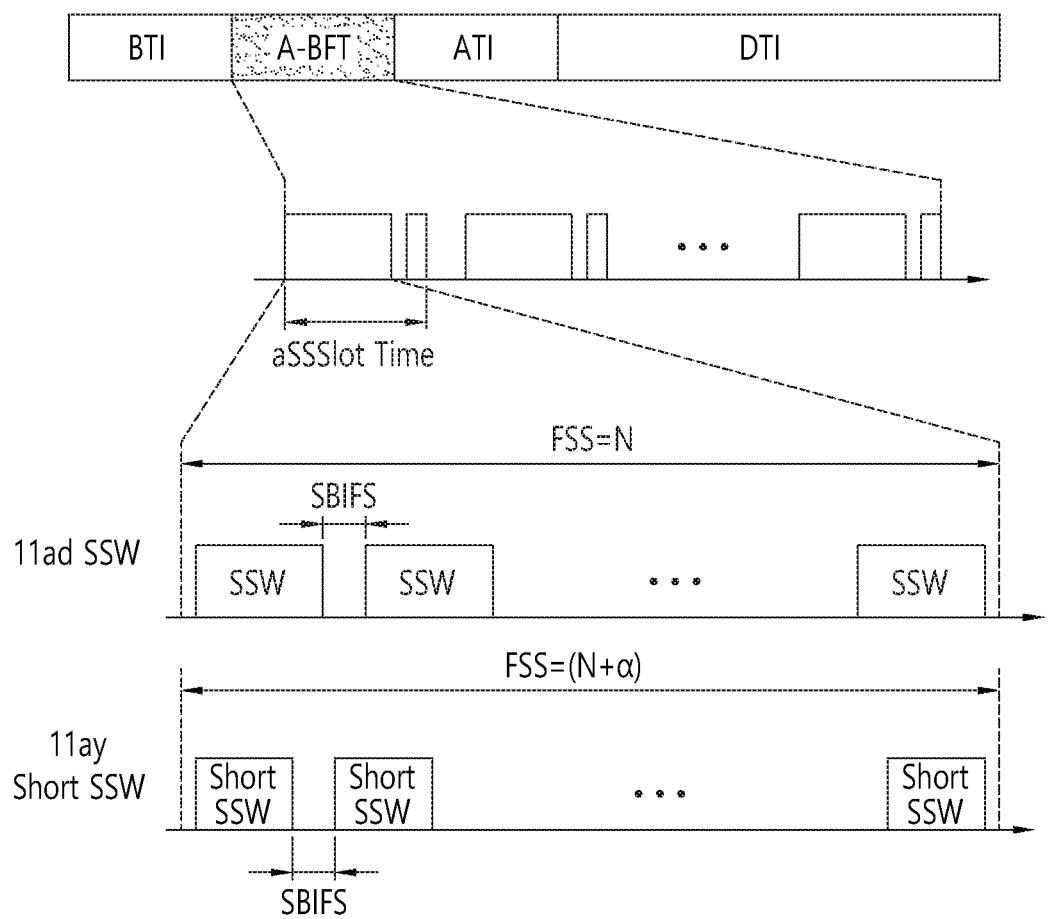
FIG. 4 illustrates an example of beamforming training according to an exemplary embodiment of this specification.

FIG. 4 illustrates an example of beamforming training according to an exemplary embodiment of this specification.

An AP transmits a beacon frame to an STA during a BTI. The beacon frame may include configuration information on the type of an SSW frame transmitted during A-BFT. A-BFT is performed per SSW slot, and A-BFT length is defined as an integer multiple of the SSW slot.

The configuration information on the type of the SSW frame included in the beacon frame is illustrated in the following table. Not all the fields are necessary, and field names are merely for illustration.

TABLE 3

| Field name | Description |
| --- | --- |
| A-BFT length | Size of A-BFT, which may be defined by the number of SSW slots. |
| FSS | Number of SSW frame allowed per SSW slot. |
| SSW frame type | Type of SSW frame transmitted during A-BFT, which may be, for example, SSW-I, SSW-II, or combination thereof. |
| Type allowance | To indicate whether SSW-II is transmitted. |

TABLE 3-continued

| Field name | Description |
| --- | --- |
| Additional slot | To indicate that SSW-II is transmitted in additional SSW. |
| A-BFT length II | Size of additional slot |
| FSS II | Number of SSWs-II allowed per additional slot |

SSW-I or SSW-II may be transmitted during A-BFT according to the configuration information. The AP and the STA may determine the type of an SSW frame transmitted during A-BFT as follows.

In a first embodiment, the type of the SSW frame may be given depending on the value of the FSS field. For example, the FSS field currently has a maximum value of 6. The STA may determine that SSW-I is transmitted when the FSS field has a value of 16 or less, and may determine that SSW-II is transmitted when the FSS field has a value greater than 16.

In a second embodiment, the type of the SSW frame directly transmitted may be specified through the SSW frame type field and/or the type allowance field. Here, the FSS field is a four-bit field, which can basically be up to 16, and thus may not be suitable to specify the number of SSWs-II having a smaller size. Accordingly, the size of the FSS field is fixed, and the STA can differently interpret the value of the FSS field depending on the type of the SSW frame.

More specifically, referring to Table 3, the AP may designate the number of short SSW frames that can be transmitted through the FSS field, and the AP may also notify the time for transmitting the short SSW through the A-BFT length field. By using theses fields, the STA (or responder) may transmit short SSW frames from one SSW slot by adjusting the time and number of transport frames (or transmission frames) that are needed for transmitting SSW frame of the legacy 11ad.

Referring to FIG. 4, the number of short SSW frames, which may be transmitted during one SSW slot time (aSSlot Time), may be increased and transmitted while maintaining the A-BFT period of the legacy 11ad. At this point, the number of short SSW frames may be notified by re-using the FSS field, which indicates the number of SSW frames. Therefore, the number of SSW frames that is indicated by the FFS field may be changed from N to N+α. Depending upon the setup information, the STA may transmit N+α number of SSW short frames during a fixed A-BFT length.

According to the exemplary embodiment of this specification, since the number of SSW slots that are needed (that should be occupied) for transmitting all of the sectors that should be transmitted (that can be transmitted) by the responders to the initiator is decreased, the time that is needed for the beamforming process may be reduced.

Additionally, even in a case where the type of SSW frame being transmitted during an A-BFT is the second type SSW frame (short SSW frame), the initiator may re-use only the FSS field without changing the FSS field value. In other words, the initiator may notify a maximum value of the number of short SSW frames that can be transmitted per SSW slot by using the FSS field without changing the FSS field value. The table shown below is an example of acknowledging a short SSW slot value by using the FSS value, among the beacon interval control fields.

TABLE 4

| FSS subfield | time based on the number of SSW frames(s) | Number of SSW frame(s) | Number of short SSW frame(s) | time based on the number of short SSW frames(s) |
|---|---|---|---|---|
| 0 | 14.91 | 1 | 1 | 8.8 |
| 1 | 30.82 | 2 | 3 | 28.4 |
| 2 | 46.73 | 3 | 4 | 38.2 |
| 3 | 62.64 | 4 | 6 | 57.8 |
| 4 | 78.55 | 5 | 8 | 77.4 |
| 5 | 94.46 | 6 | 9 | 87.2 |
| 6 | 110.37 | 7 | 11 | 106.8 |
| 7 | 126.28 | 8 | 12 | 116.6 |
| 8 | 142.19 | 9 | 14 | 136.2 |
| 9 | 158.1 | 10 | 16 | 155.8 |
| 10 | 174.01 | 11 | 17 | 165.6 |
| 11 | 189.92 | 12 | 19 | 185.2 |
| 12 | 205.83 | 13 | 21 | 204.8 |
| 13 | 221.74 | 14 | 22 | 214.6 |
| 14 | 237.65 | 15 | 24 | 234.2 |
| 15 | 253.56 | 16 | 25 | 244 |

Table 4, which is presented above, will hereinafter be described in detail. Firstly, according to the setup information of the above-described Table 3, the AP and the STA may determine the type of the SSW frame that is transmitted during an A-BFT as the second type SSW frame (short SSW frame). Since the type of the SSW frame does not correspond to the first type SSW frame (legacy SSW frame), the FSS field indicating the number of first type SSW frames may be re-used so as to notify the maximum value of the number of second type SSW frames.

Herein, the maximum value of the number of second type SSW frames may correspond to the maximum number of short SSW frames that can be transmitted within a predetermined time in order to perform sector sweep. The predetermined time for performing the sector sweep may correspond to a SSW slot time (aSSSlot Time) when the type of the SSW frames are the first time SSW frame.

More specifically, even if the type of the SSW frames being transmitted during the A-BFT is determined as the second type SSW frame, the A-BFT length and the SSW slot time within the A-BFT may be fixed. Therefore, the FSS field may indicate a maximum number of short SSW frames that can be transmitted within a fixed SSW slot time.

Therefore, according to the setup information and the FSS value, the STA may transmit and/or receive a maximum number of short SSW frames or less that is indicated by the FSS field value during the SSW slot time within a fixed A-BFT.

Figure 5:
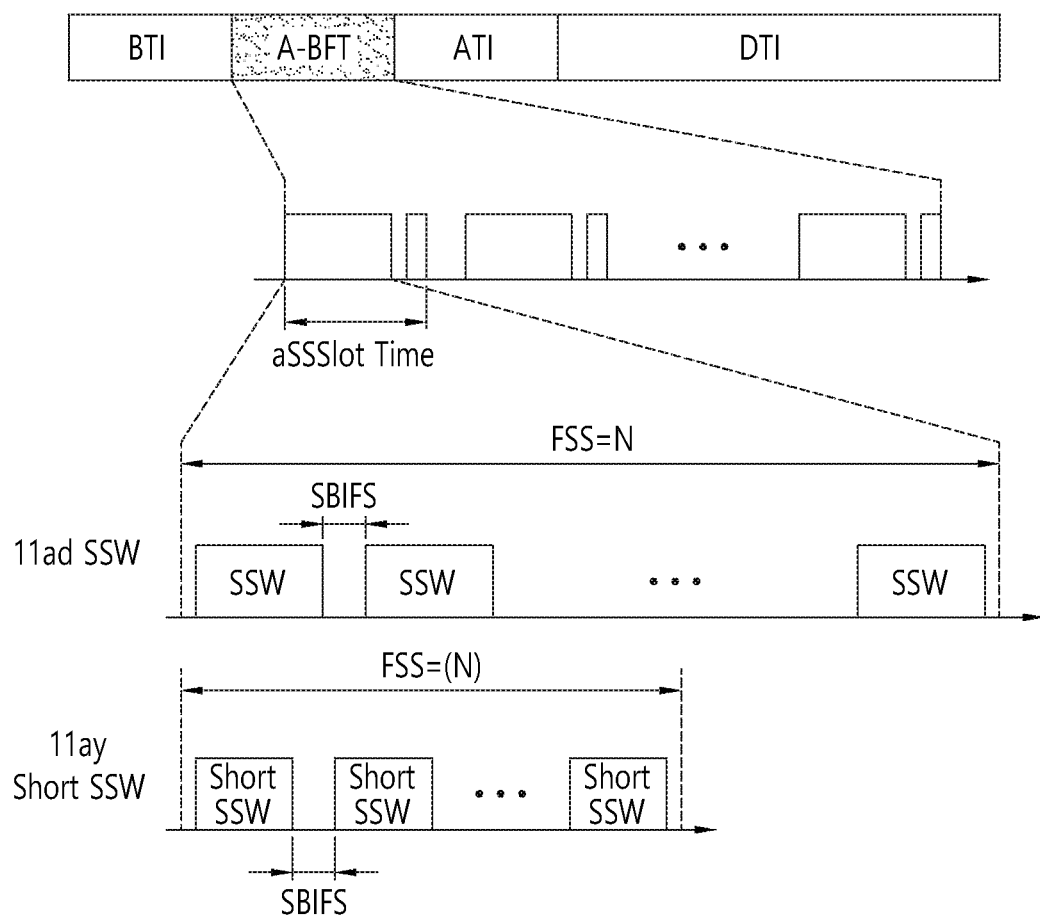
FIG. 5 illustrates another example of beamforming training according to an exemplary embodiment of this specification.

FIG. 5 illustrates another example of beamforming training according to an exemplary embodiment of this specification.

In a third exemplary embodiment, the type of the SSW frame may be designated in accordance with the A-BFT length. FIG. 5 shows a SSW frame transmission according to the A-BFT length. If the A-BFT length is greater than a specific value, it may be known that SSW-I is transmitted, and, if the A-BFT length is less than or equal to a specific value, it may be known that SSW-II is transmitted.

Additionally, referring to FIG. 5, the number of short SSW frames that can be transmitted within one SSW slot in the legacy 802.11ad may be fixed, and the A-BFT length/SSW slot time may be adjusted and transmitted. (More specifically, the short SSW frame may be transmitted and/or received by reducing the A-BFT length). At this point, the number of SSW frames that is indicated by the FSS field may be given a constant value of FSS=N.

A method for fixing the number of short SSW frames may include a method of indicating the number of short SSW frames by using one value among the beacon interval control fields. If the value range of the parameters used is equal to the value range of the number of short SSW frames, the value among the beacon interval control fields may be used without any change (or variation). And, if the value range of the parameters used is not equal to the value range of the number of short SSW frames, the value among the beacon interval control fields may be used by newly creating a table that matches the parameter values.

Figure 6:
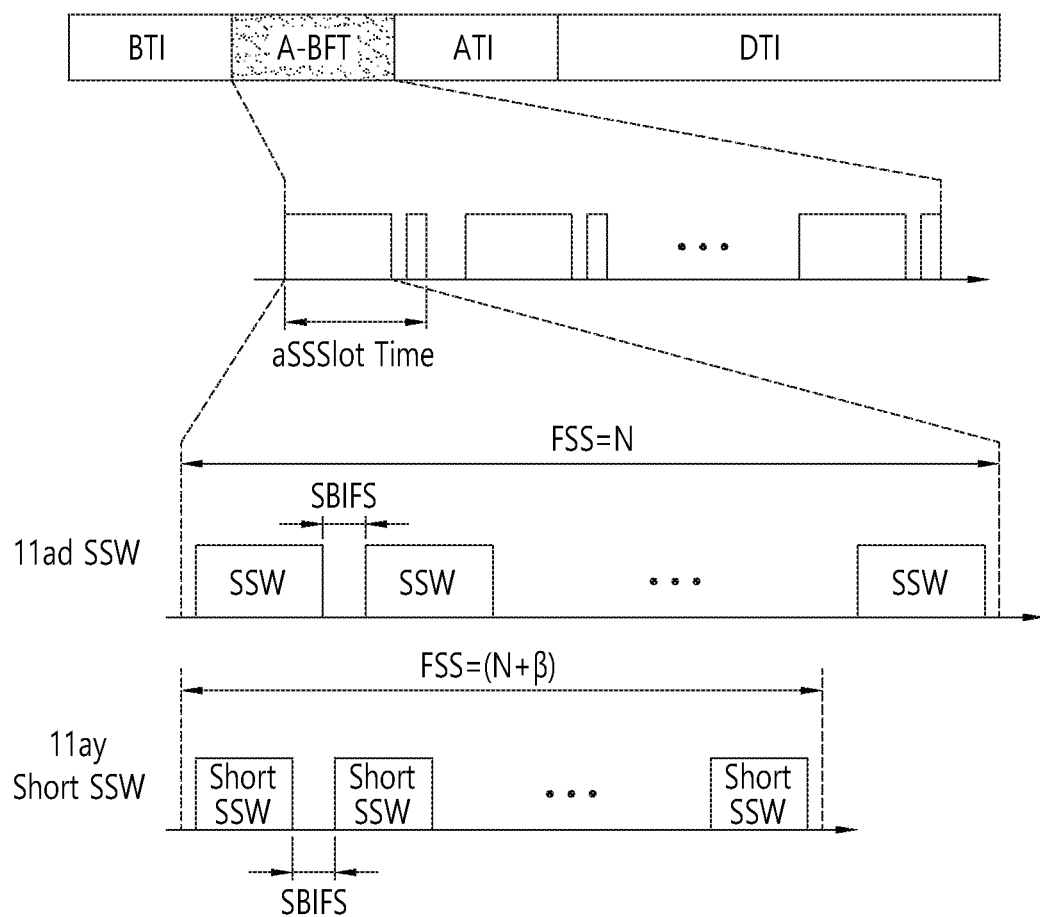
FIG. 6 illustrates yet another example of beamforming training according to an exemplary embodiment of this specification.

FIG. 6 illustrates yet another example of beamforming training according to an exemplary embodiment of this specification.

The STA may perform transmission by flexibly adjusting the A-BFT length/SSW slot time and the number of frames that can be transmitted within one SSW slot.

Transmission may be performed by flexibly adjusting the A-BFT length/SSW slot time and the number of frames that can be transmitted within one SSW slot in accordance within the channel environment and the number of beams that need to be transmitted. More specifically, the AP may reduce the A-BFT length and may also increase the number of short SSW frames by changing the FSS field value. The number of SSW frame that is indicated by the FSS field may be changed from N to N+β.

Depending upon the setup information, the STA may transmit and/or receive N+β number of short SSW frame during the reduced A-BFT length.

Figure 7:
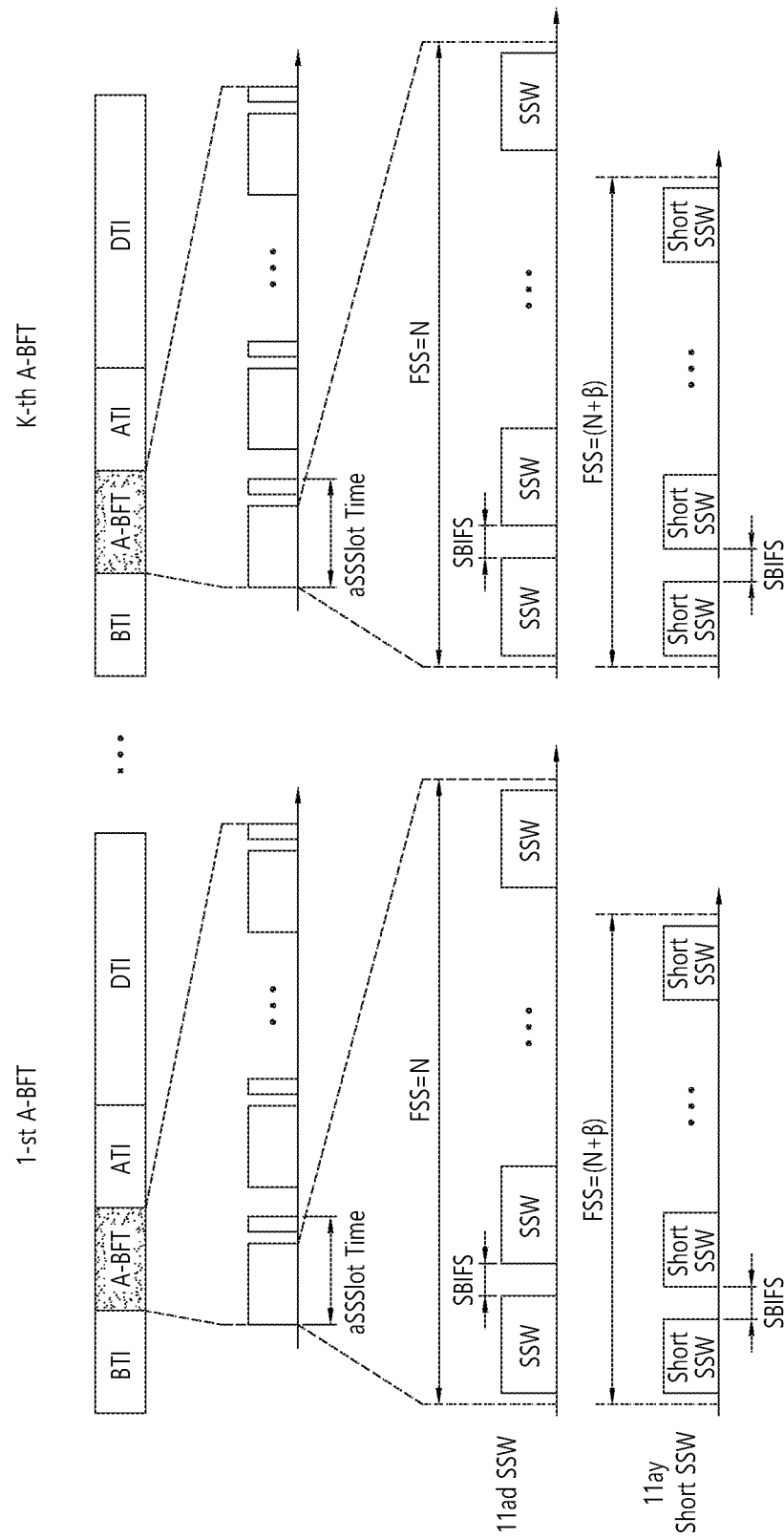
FIG. 7 illustrates yet another example of beamforming training according to an exemplary embodiment of this specification.

FIG. 7 illustrates yet another example of beamforming training according to an exemplary embodiment of this specification.

The above-described method refers to a short SSW frame transmission within one A-BFT period and one SSW slot. This may be extendedly applied to multiple A-BFT periods and multiple SSW slots. For example, the legacy fragmented TXSS field, and so on, may be adjusted or a new field/frame may be designed.

More specifically, the above-described exemplary embodiment may be extendedly applied to multiple A-BFT periods. If the beamforming of a responder is not completed within one A-BFT period and one SSW slot, information on the incompletion of the beamforming is exchanged between the responder and the initiator, and the initiator may reconfigure (or reset) the A-BFT period/SSW slot for the remaining beamforming.

For example, referring to FIG. 7, if the beamforming of the responder is not completed within a $1^{st}$ A-BFT, the initiator may configure (or set up) a $2^{nd}$ A-BFT (or $K^{th}$ A-BFT) for the remaining beamforming. Alternatively, if the beamforming of the responder is not completed within a first SSW slot in the $1^{st}$ A-BFT, the initiator may configure an additional SSW slot in the $1^{st}$ A-BFT for the remaining beamforming.

Additionally, the beamforming of multiple responders may be independently performed in multiple A-BFT periods/SSW slots. For example, referring to FIG. 7, the beamforming of the first responder may be performed within a SSW slot in the $1^{st}$ A-BFT, and the beamforming of the second responder may be performed within a SSW slot in the $2^{nd}$ A-BFT, and the beamforming of the $K^{th}$ responder may be performed within a SSW slot in the $K^{th}$ A-BFT.

Figure 8:
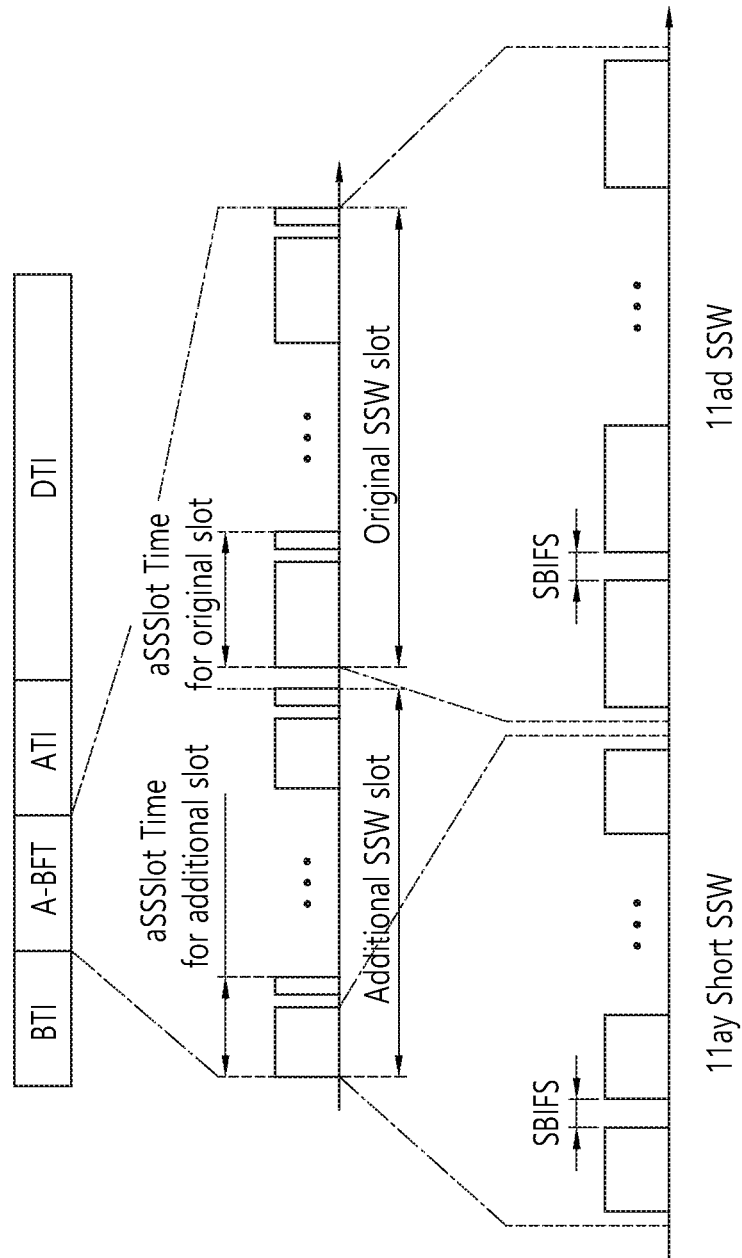
FIG. 8 illustrates an example in which an SSW slot is defined according to the type of an SSW frame.

FIG. 8 illustrates a further example of beamforming training according to an exemplary embodiment of this specification.

In a fourth exemplary embodiment, different SSW slots may be defined in accordance with the type of SSW frames.

FIG. 8 illustrates an example in which an SSW slot is defined according to the type of an SSW frame.

Referring to FIG. 8, the first type SSW frame is transmitted from an original SSW slot. An additional SSW slot is configured for the second type SSW frame. Although FIG. 8 shows an example wherein the additional SSW slot is positioned in front of the original SSW slot, the additional SSW slot may also be positioned behind (or after) the original SSW slot. In order to define the additional SSW frame, an additional A-BFT length and an additional FSS of Table 3 may be defined.

Figure 9:
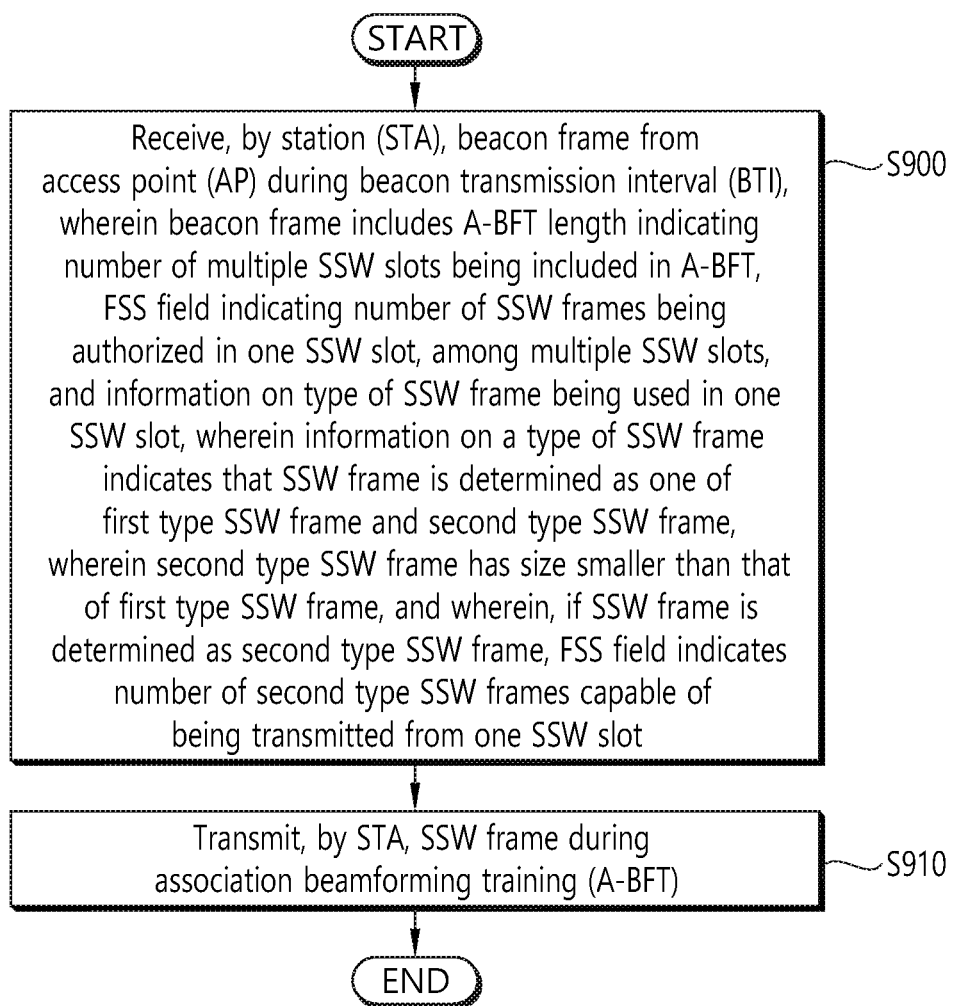
FIG. 9 is a flow chart showing a procedure for beamforming training according to an exemplary embodiment of this specification.

FIG. 9 is a flow chart showing a procedure for beamforming training according to an exemplary embodiment of this specification.

The example of FIG. 9 is performed by an STA. Herein, the STA may correspond to a responder participating in a beamforming training, and an AP may correspond to an initiator initiating the beamforming training.

In step S900, the station (STA) receives a beacon frame from an access point (AP) during a beacon transmission interval (BTI).

In step S910, the STA may transmit a Sector SWeep (SSW) during an association beamforming training (A-BFT).

The beacon frame includes an A-BFT length indicating a number of multiple SSW slots (or an A-BFT length including information on a number of multiple SSW slots) that are included in the A-BFT, a FSS field indicating a number of SSW frames (or an FSS field including information on a number of SSW frames) allowed (authorized or approved) in one slot, among the multiple SSW slots, and information on a type of the SSW frame that is used in the one slot.

The information on a type of the SSW frame indicates that the SSW frames are determined as one of a first type SSW frame and a second type SSW frame. The first type SSW frame may correspond to a legacy SSW frame that is supported by 802.11ad, and the second type SSW frame may correspond to a short SSW frame that is supported by 802.11ay. Herein, the second type SSW frame has a size that is smaller than the first type SSW frame.

Since the size of the second type SSW frame is smaller than the size of the first type SSW frame, the beamforming time may be reduced.

Additionally, the second type SSW frame may also be used in the same A-BFT period. More specifically, the A-BFT length may be fixed regardless of the type of the SSW frame. Accordingly, a length of the multiple SSW slots within the A-BFT and a length of the one SSW slot may be fixed. More specifically, the STA may perform transmission by increasing the number of short SSW frames that can be transmitted within one SSW slot (aSSSlot Time) while maintaining the legacy 802.11ad A-BFT period.

Additionally, the AP may notify the number of short SSW frames by re-using the FSS field, which indicates the number of SSW frames. If the SSW frames are determined as the second type SSW frame, the FSS field may indicate a number of the second type SSW frames that can be transmitted within the one SSW slot.

Additionally, if the SSW frames are determined as the second type SSW frame, the FSS field may indicate a maximum number of the second type SSW frames that can be transmitted within the one slot. Thus, a maximum number of the second type SSW frames or less may be transmitted within the one SSW slot. More specifically, based on the A-BFT length, the FSS field, and the information on a type of the SSW frame, the maximum number of the second type SSW frames or less may be transmitted within one SSW slot during a fixed A-BFT length.

Additionally, if the SSW frames are determined as the first type SSW frame, the FSS field may indicate a number of the first type SSW frames that are transmitted within the one SSW slot.

The maximum number of the second type SSW frames may be greater than or equal to the number of the first type SSW frames. More specifically, if the second type SSW frame are used, a larger number of SSW frame may be transmitted for performing sector sweep, as compared to when using the first type SSW frame. Therefore, since the number of SSW slots that are needed for transmitting all of the SSW frames may be reduced, the time needed for performing beamforming may be reduced.

Additionally, the one SSW slot may include a transmission time of the SSW frame and an Inter Frame Spacing (IFS) time. The transmission time of the SSW frame may correspond to a value that is obtained by multiplying the transmission time of one first type SSW frame by the number of first type SSW frames. The IFS time may correspond to a value that is obtained by multiplying 1us by the number of first type SSW frames. Herein, the transmission time of the one first type SSW frame may be equal to 14.91 us.

Furthermore, the one SSW slot may include a transmission time of the SSW frame and an Inter Frame Spacing (IFS) time. The transmission time of the SSW frame may correspond to a value that is obtained by multiplying the transmission time of one second type SSW frame by the maximum number of second type SSW frames. The IFS time may correspond to a value that is obtained by multiplying 1us by the maximum number of second type SSW frames. Herein, the transmission time of the one second type SSW frame may be equal to 8.8 us.

Figure 10:
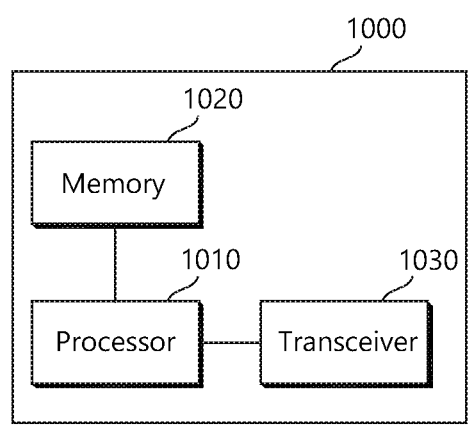
FIG. 10 is a block diagram showing a wireless device that can apply the exemplary embodiment of this specification.

FIG. 10 is a block diagram showing a wireless device that can apply the exemplary embodiment of this specification.

Referring to FIG. 10, as an STA that can implement the above-described exemplary embodiment of this specification, the wireless device may be operated as an AP or a non-AP STA. Additionally, the wireless device may correspond to the above-described user, or the wireless device may correspond to a transmitting device transmitting a signal to the user.

As shown in the drawing, the wireless device of FIG. 10 includes a processor (1010), a memory (1020), and a transceiver (1030). The processor (1010), the memory (1020), and the transceiver (1030) shown in FIG. 10 may each be implemented as a separate chip, or at least two or more blocks/functions may be implemented through one chip.

The transceiver (1030) is a device including a transmitter and a receiver. And, in case a specific operation is performed, the transceiver (1030) may perform the operations of any one of the transmitter and the receiver, or the transceiver (1030) may perform the operations of both the transmitter and the receiver. The transceiver (1030) may include one or more antennas transmitting and/or receiving radio signals. Additionally, the transceiver (1030) may include an amplifier amplifying a reception signal and/or a transmission signal and a band-pass filter performing transmission within a specific frequency band.

The processor (1010) may implement proposed functions, procedures and/or methods described in this specification. For example, the processor (1010) may perform operations according to the above-described exemplary embodiment of this specification. More specifically, the processor (1010) may perform the operations that are disclosed in the exemplary embodiments shown in FIG. 1 to FIG. 9.

The processor (1010) may include an application-specific integrated circuit (ASIC), other chipsets, a logic circuit, a data processing device and/or a converter interconverting a baseband signal and a radio signal to and from one another. The memory (1020) may include a read-only memory (ROM), a random access memory (RAM), a flash memory, a memory card, a storage medium and/or another storage device.

Figure 11:
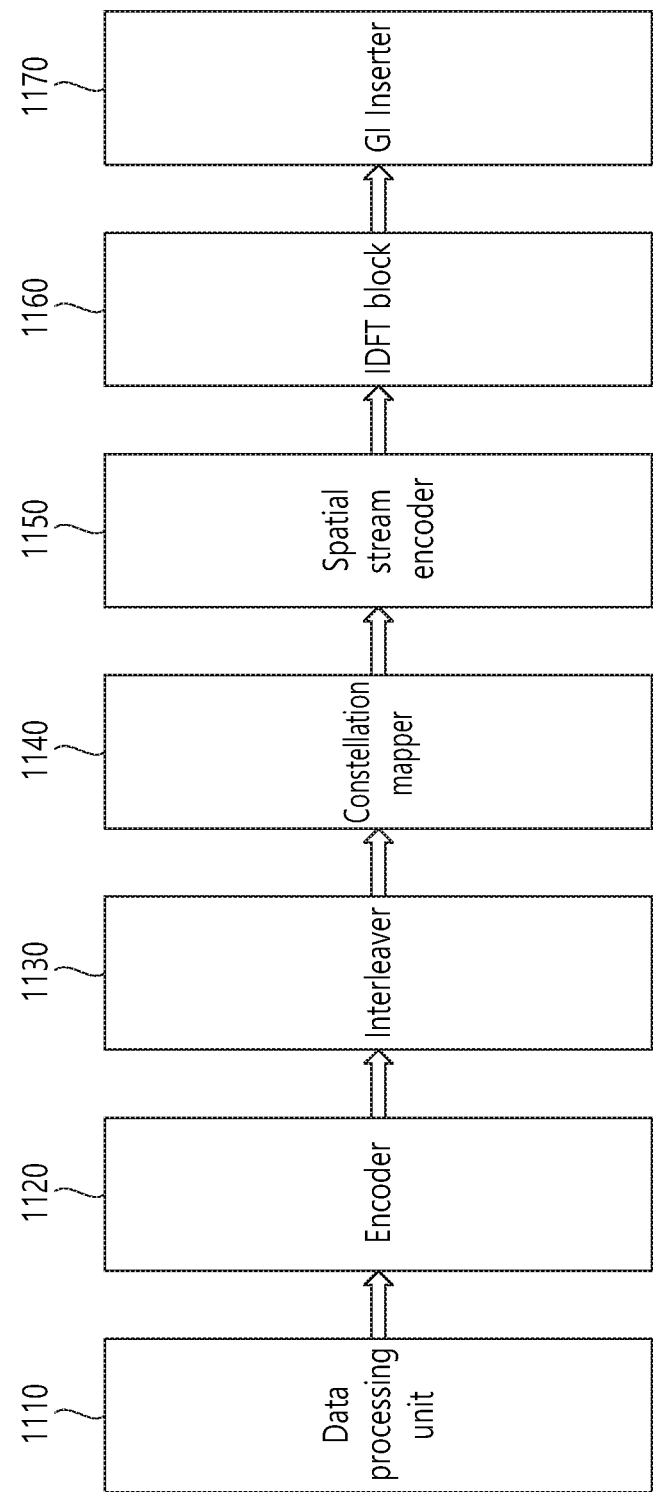
FIG. 11 is a block diagram showing an example of a device being included in a processor.

FIG. 11 is a block diagram showing an example of a device being included in a processor. For simplicity in the description of this specification, the example of FIG. 11 is described based on a block for a transmission signal. However, it will be apparent that the corresponding block may also be used for processing a reception signal.

A data processing unit (1110) shown in FIG. 11 generates transmission data (control data and/or user data) corresponding to a transmission signal. An output of the data processing unit (1110) may be inputted to an encoder (1120). The encoder (1120) may perform coding by using a binary convolutional code (BCC) scheme or a low-density parity-check (LDPC) scheme, and so on. At least one encoder (1120) may be included in this structure, and the number of encoders (1120) included in this structure may be determined in accordance with diverse information (e.g., number of data streams, and so on).

An output of the encoder (1120) may be inputted to an interleaver (1130). In order to prevent an error burst, which is caused by fading, and so on, from occurring, the interleaver (1130) performs an operation of distributing (or dispersing) consecutive bit signals within a wireless resource (e.g., time and/or frequency). At least one interleaver (1130) may be included in this structure, and the number of interleavers (1130) included in this structure may be determined in accordance with diverse information (e.g., number of spatial streams, and so on).

An output of the interleaver (1130) may be inputted to a constellation mapper (1140). The constellation mapper (1140) performs constellation mapping of biphase shift keying (BPSK), quadrature phase shift keying (QPSK), n-quadrature amplitude modulation (n-QAM), and so on.

An output of the constellation mapper (1140) may be inputted to a spatial stream encoder (1150). The spatial stream encoder (1150) performs data processing in order to transmit a transmission signal through at least one spatial stream. For example, the spatial stream encoder (1150) may perform at least one of space-time block coding (STBC), cyclic shift diversity (CSD) insertion, and spatial mapping on the transmission signal.

An output of the spatial stream encoder (1150) may be inputted to an IDFT (1160) block. The IDFT (1160) block performs inverse discrete Fourier transform (IDFT) or inverse Fast Fourier transform (IFFT).

An output of the IDFT (1160) block is putted to a Guard Interval (GI) inserter (1170), and an output of the GI inserter (1170) is inputted to the transceiver (1030) of FIG. 10.

What is claimed is:

1. A method in a wireless local area network (WLAN), comprising:

receiving, by a station (STA), a beacon frame from an access point (AP) during a beacon transmission interval (BTI); and wherein the beacon frame includes an association beamforming training (A-BFT) length field including information related to a number of multiple short sector sweep (SSW) slots and a frame per SSW slot (FSS) field including information related to a number of SSW frames that can be transmitted in one SSW slot among the multiple SSW slots, wherein the SSW frames are first type SSW frames or second type SSW frames, wherein one second type SSW frame is shorter than one first type SSW frame, and wherein the STA differently interprets a value of the FSS field to be a number of the first type SSW frames or a number of the second type SSW frames based on the following table:

TABLE

| | Value of the FSS field | | | | | | | |
|---|---|---|---|---|---|---|---|---|
| | 0 | 1 | 2 | 3 | 4 | 5 | 6 | 7 |
| Number of first type SSW frames | 1 | 2 | 3 | 4 | 5 | 6 | 7 | 8 |
| Number of second type SSW frames | 1 | 3 | 4 | 6 | 8 | 9 | 11 | 12 |
| | Value of the FSS field | | | | | | | |
| | 8 | 9 | 10 | 11 | 12 | 13 | 14 | 15 |
| Number of first type SSW frames | 9 | 10 | 11 | 12 | 13 | 14 | 15 | 16 |
| Number of second type SSW frames | 14 | 16 | 17 | 19 | 21 | 22 | 24 | 25; | and transmitting, by the STA, the SSW frames during an association beamforming training (A-BFT) interval to the AP.

2. The method of claim 1, wherein the STA interprets the value of the FSS field to be the number of the first type SSW frames when the SSW frames are first type SSW frames.

3. The method of claim 1, wherein the STA interprets the value of the FSS field to be the number of the second type SSW frames when the SSW frames are second type SSW frames.

4. The method of claim 1, wherein the FSS field has a length of 4 bits.

5. The method of claim 1, wherein a length of the A-BFT interval is fixed regardless of a type of the SSW frames.

6. A station (STA) in a wireless local area network (WLAN), comprising:

a transceiver configured to transmit and/or receive a wireless signal; and a processor configured to control the transceiver, wherein the processor is further configured to:

receive, via the transceiver, a beacon frame from an access point (AP) during a beacon transmission interval (BTI); and wherein the beacon frame includes an association beamforming training (A-BFT) length field including information related to a number of multiple short sector sweep (SSW) slots and a frame per SSW slot (FSS) field including information related to a number of SSW frames that can be transmitted in one SSW slot among the multiple SSW slots, wherein the SSW frames are first type SSW frames or second type SSW frames, wherein one second type SSW frame is shorter than one first type SSW frame, and wherein the processor differently interprets a value of the FSS field to be a number of the first type SSW frames or a number of the second type SSW frames based on the following table:

TABLE

| | Value of the FSS field | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Number of first type SSW frames | 1 | 2 | 3 | 4 | 5 | 6 | 7 | 8 | 9 | 10 | 11 | 12 | 13 | 14 | 15 | 16 |
| Number of second type SSW frames | 1 | 3 | 4 | 6 | 8 | 9 | 11 | 12 | 14 | 16 | 17 | 19 | 21 | 22 | 24 | 25; | and
  transmit, via the transceiver the SSW frames during an A-BFT interval to the AP.

7. The STA of claim 6, wherein the processor interprets the value of the FSS field to be the number of the first type SSW frames when the SSW frames are first type SSW frames.

8. The STA of claim 6, wherein the processor interprets the value of the FSS field to be the number of the second type SSW frames when the SSW frames are second type SSW frames.

9. The STA of claim 6, wherein the FSS field has a length of 4 bits.

10. The STA of claim 6, wherein a length of the A-BFT interval is fixed regardless of a type of the SSW frames.

* * * * *